US012670350B1

(12) United States Patent
Tran et al.

(10) Patent No.: US 12,670,350 B1
(45) Date of Patent: Jun. 30, 2026

(54) SYSTEMS AND METHODS FOR DYNAMICALLY GENERATING SCANNABLE TEXT-BASED CODE IN RESPONSE TO ERROR

(71) Applicant: Dell Products L.P., Round Rock, TX (US)

(72) Inventors: Thao N. Tran, Cedar Park, TX (US); Justin W. Johnson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/991,826

(22) Filed: Dec. 23, 2024

(51) Int. Cl.
*G06K 19/06* (2006.01)
*G06F 16/955* (2019.01)

(52) U.S. Cl.
CPC ... *G06K 19/06037* (2013.01); *G06F 16/9554* (2019.01); *G06K 19/06046* (2013.01)

(58) Field of Classification Search
CPC ........ G06K 19/06037; G06K 19/06046; G06F 16/9554
USPC ........................................................ 235/494
See application file for complete search history.

(56) References Cited

U.S. PATENT DOCUMENTS

| | | | | |
|---|---|---|---|---|
| 7,637,436 | B1 * | 12/2009 | Anderson | G06K 1/121 |
| | | | | 235/462.07 |
| 12,204,968 | B1 * | 1/2025 | Yeomans | G06K 19/06037 |
| 2024/0411447 | A1 * | 12/2024 | Lee | G06V 30/10 |
| 2025/0384235 | A1 * | 12/2025 | Yeomans | G06K 19/06046 |

* cited by examiner

*Primary Examiner* — Ahshik Kim

(74) *Attorney, Agent, or Firm* — Jackson Walker L.L.P.

(57) ABSTRACT

An information handling system may include a memory and a processor communicatively coupled to the memory and configured to convert a string of text into a text-based scannable code comprising a string of characters including space characters, special characters, and linefeed characters, such that when the string of characters is displayed to a display device, the string of characters resembles an image-based scannable code.

18 Claims, 3 Drawing Sheets

200

32 219                    223 220

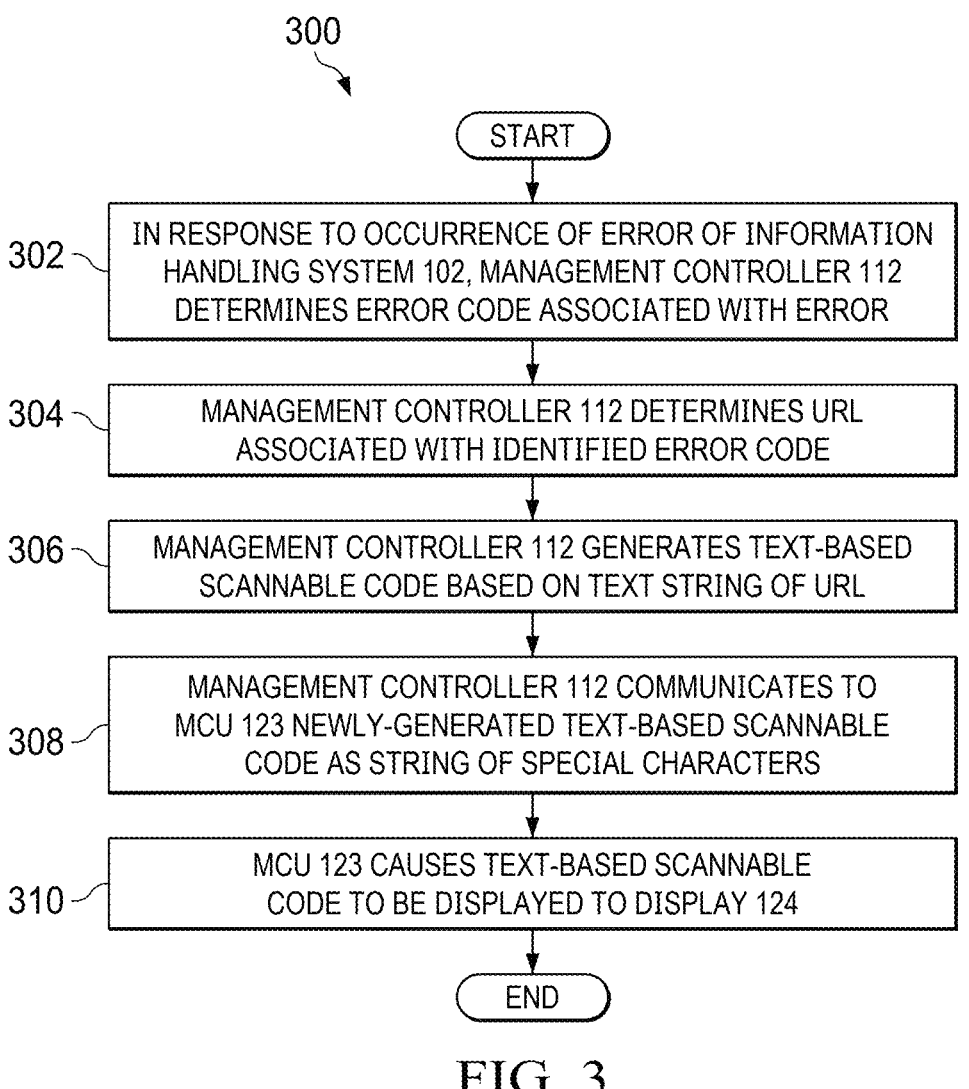

300

START

302 — IN RESPONSE TO OCCURRENCE OF ERROR OF INFORMATION HANDLING SYSTEM 102, MANAGEMENT CONTROLLER 112 DETERMINES ERROR CODE ASSOCIATED WITH ERROR

304 — MANAGEMENT CONTROLLER 112 DETERMINES URL ASSOCIATED WITH IDENTIFIED ERROR CODE

306 — MANAGEMENT CONTROLLER 112 GENERATES TEXT-BASED SCANNABLE CODE BASED ON TEXT STRING OF URL

308 — MANAGEMENT CONTROLLER 112 COMMUNICATES TO MCU 123 NEWLY-GENERATED TEXT-BASED SCANNABLE CODE AS STRING OF SPECIAL CHARACTERS

310 — MCU 123 CAUSES TEXT-BASED SCANNABLE CODE TO BE DISPLAYED TO DISPLAY 124

END

FIG. 3

SYSTEMS AND METHODS FOR DYNAMICALLY GENERATING SCANNABLE TEXT-BASED CODE IN RESPONSE TO ERROR

TECHNICAL FIELD

The present disclosure relates in general to information handling systems, and more particularly to methods and systems for dynamically generating a scannable image code in response to an error in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When an error occurs during operation of an information handling system, particularly during a boot process of an information handling system, it may be useful to generate a visual message to the user to aid the user in remedying the error. For example, in existing information handling systems, in response to an error occurring during a boot process, a controller unit (e.g., a timing controller) in a display device or display panel of the information handling system may display a static quick-response (QR) code in the form of an image bitmap. Accordingly, the user may scan the QR code (e.g., with a smart phone) that may direct the user to the customer support homepage of the information handling system vendor. However, it may remain cumbersome using such approach for the user to figure out the error characteristic such that the user can effectively remedy the problem through the customer support homepage.

While it may be desirable to generate a unique QR code bitmap for each error code in a catalog of error codes (e.g., so that scanning of the unique QR code leads the user to a specific page within the customer support website of the information handling system vendor), this would require a significant increase of memory within the controller unit to store all of the possible QR code image bitmaps, which would add significant cost. Plus, storing a number of pre-generated bitmaps in the timing controller at the time of manufacture of the display device would limit the additional QR code bitmaps in the event of a new error use case, and storing a number of pre-generated bitmaps may also prevent the use of runtime information (e.g., unique identifier of information handling system, diagnostic data, etc.) in connection with the pre-generated bitmaps.

SUMMARY

In accordance with the teachings of the present disclosure, the disadvantages and problems associated with traditional approaches to serviceability of an information handling system may be reduced or eliminated.

In accordance with embodiments of the present disclosure, an information handling system may include a memory and a processor communicatively coupled to the memory and configured to convert a string of text into a text-based scannable code comprising a string of characters including space characters, special characters, and linefeed characters, such that when the string of characters is displayed to a display device, the string of characters resembles an image-based scannable code.

In accordance with these and other embodiments of the present disclosure, a method may include converting a string of text into a text-based scannable code comprising a string of characters including space characters, special characters, and linefeed characters, such that when the string of characters is displayed to a display device, the string of characters resembles an image-based scannable code.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to convert a string of text into a text-based scannable code comprising a string of characters including space characters, special characters, and linefeed characters, such that when the string of characters is displayed to a display device, the string of characters resembles an image-based scannable code.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a flow chart of an example method for dynamically generating a text-based scannable code in response to an error, in accordance with embodiments of the present disclosure.

DETAILED DESCRIPTION

Figure 1:
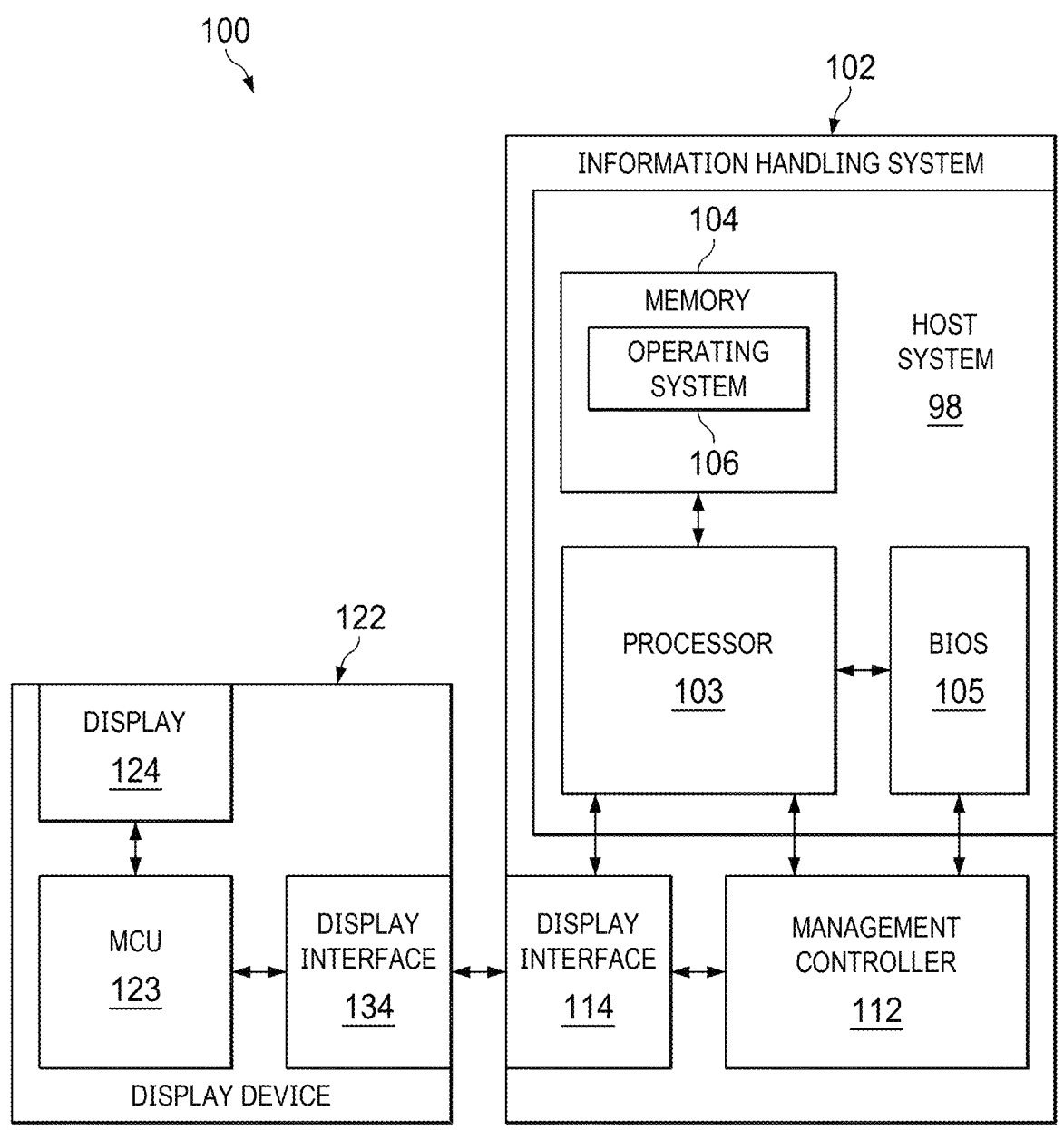
FIG. 1 illustrates a block diagram of an example system comprising an information handling system and a display device, in accordance with embodiments of the present disclosure.
Figure 2:
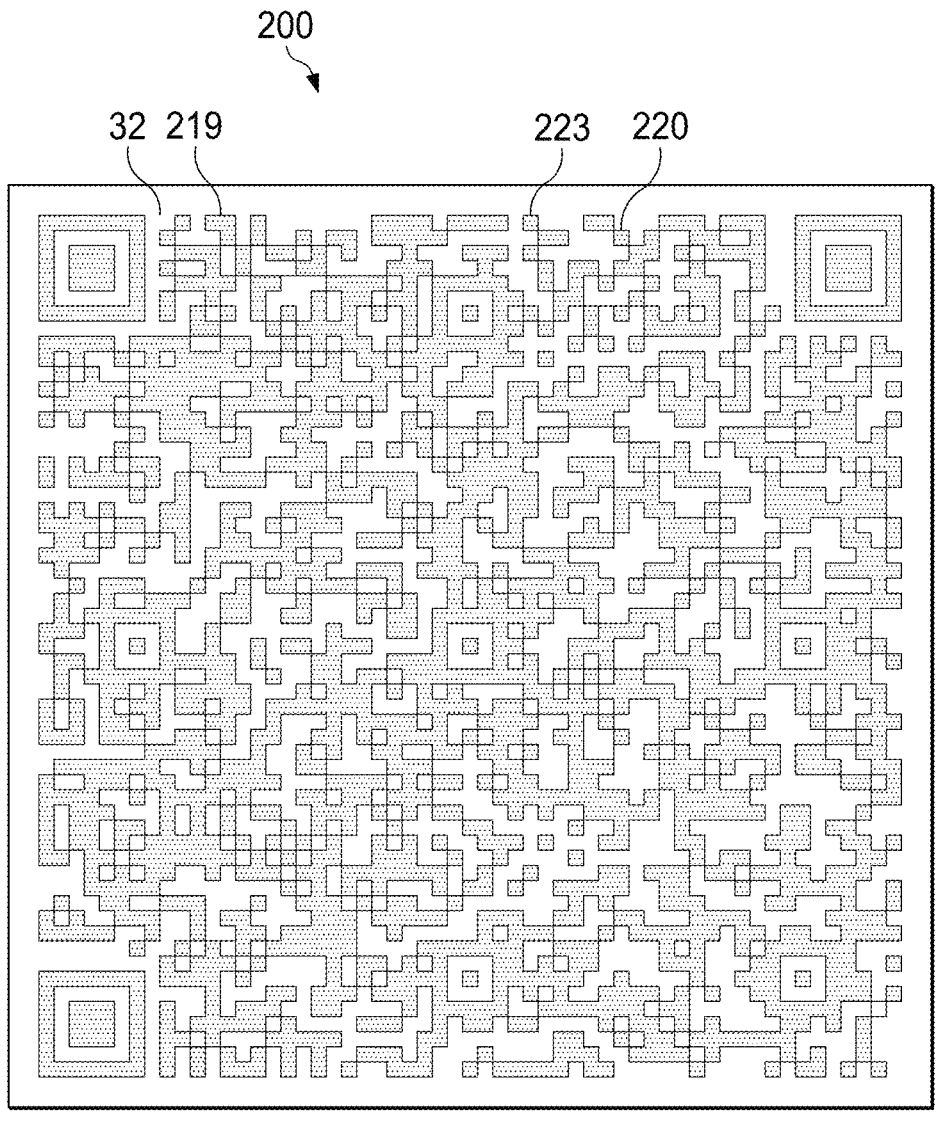
FIG. 2 illustrates an example text-based QR code, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 comprising an information handling system 102 and a display device 122, in accordance with embodiments of the present disclosure. Although FIG. 1 depicts display device 122 as externally coupled to information handling system 102 (e.g., via an appropriate external cable) in some embodiments (e.g., a notebook or tablet), display device 122 may be integrated with information handling system 102 into a common chassis and/or enclosure.

In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a management controller 112 communicatively coupled to processor 103 and BIOS 105, and a display interface 114 communicatively coupled to processor 103 and management controller 112. In operation, processor 103 and memory 104 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may have stored thereon an operating system 106.

Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide management facilities for management of information handling system 102. Such management may be made by management controller 112 even if information handling system 102 is powered off or powered to a standby state. Management controller 112 may include a processor, a memory, and or other components, such as display interface 114. In certain embodiments, management controller 112 may include or may be an integral part of an embedded controller (EC), baseboard management controller (BMC), or a remote access controller (e.g., a Dell Remote Access Controller or Integrated Dell Remote Access Controller).

Display interface 114 may comprise any suitable system, device, or apparatus configured to serve as a communication interface between display device 122 and either or both of processor 103 and management controller on 112. For example, in some embodiments, display interface 114 may comprise a cable interface in accordance with the Universal Serial Bus Power Delivery (USB PD) specification. In these and other embodiments, display interface 114 may be communicatively coupled to management controller 112 via an Inter-Integrated Circuit (I2C) communications bus.

In addition to processor 103, memory 104, management controller 112, and display interface 114, information handling system 102 may include one or more other information handling resources. In addition, although FIG. 1 shows information handling system 102 configured as what many would consider a computing system, in some embodiments, information handling system 102 may include fewer components than that often seen in a computing system, and may comprise a device with less functionality, such as a docking station or port replicator.

As depicted in FIG. 1, display device 122 may include a microcontroller unit (MCU) 123, a display 124 communicatively coupled to MCU 123, and a display interface 134 communicatively coupled to MCU 123.

MCU 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, MCU 123 may comprise a timing controller.

Display 124 may include any system, device, or apparatus configured to generate graphical images and/or reproduce alphanumeric text for viewing by a user of information handling system 102, based on display data communicated to display 124 from information handling system 102. Display 124 may comprise a light-emitting diode display, liquid crystal display, and/or any other suitable display.

Display interface 134 may comprise any suitable system, device, or apparatus configured to serve as a communication interface between display device 122 and either or both of processor 103 and management controller 112. For example, in some embodiments, display interface 134 may comprise a cable interface in accordance with the USB PD specification.

For clarity of exposition, FIG. 1 depicts only a single display device 122 communicatively coupled to information handling system 102. However, in some embodiments of system 100, system 100 may include a plurality of display devices 122 communicatively coupled to information handling system 102 (e.g., directly to information handling system 102 or in a daisy chain from display device 122 to display device 122).

In operation, management controller 112 may store an error codes table or other data structure (e.g., map, list, etc.), with each entry including an error code and a uniform resource locator (URL) (e.g., for a particular web page on a customer support website) associated with such error code. In some embodiments, such error code may also include a text string (other than the URL) associated with the error code (e.g., for display along with a dynamically-generated QR code). An example portion of an example error codes table is set forth below.

| Error Code | Text to be displayed | URL |
|---|---|---|
| . . . | . . . | . . . |
| 3, 3 | Recovery Image Not Found | https://www.dell.com/support/KB-1-RecoveryImageNotFound |
| 3, 4 | Recovery Image Invalid | https://www.dell.com/support/KB-2-RecoveryImageInvalid |
| 3, 5 | EC Power Rail Error | https://www.dell.com/support/KB-3-ECPowerRailError |
| . . . | . . . | . . . |

In response to occurrence of an error (e.g., an error during power-on self-test or another portion of a boot process) detected by management controller 112 (e.g., based on a receipt of a signal or non-receipt of a signal from BIOS 105), management controller 112 may determine an error code associated with the error, look-up the URL associated with the identified error code, and generate a text-based QR code from the text of the URL using any appropriate text-to-QR code encoding scheme.

As used herein, a text-based QR code means a QR code generated from text characters, as opposed to a bitmap or other graphical image. To generate a text-based QR code, management controller 112 may generate a string of special characters comprising rectangular boxes, space characters, and linefeed characters (e.g., to create a new line of text) arranged appropriately such that the resulting string, when displayed to display 124, has the appearance of a QR code. Example characters used to generate a text-based QR code may include:

A "full block" character (ASCII code 219): "█"

A "lower half block" character (ASCII code 220): "▄"

An "upper half block" character (ASCII code 223): "▀"

A space character (ASCII code 32): " "

A linefeed character (ASCII code 10)

Management controller 112 may then communicate to MCU 123 the newly-generated text-based QR code as a string of special characters (e.g., the block characters described above), space characters, and linefeed characters. In some embodiments, management controller 112 may also communicate other text to be displayed alongside the text-based QR code, such as those entries in the "Text to be displayed" column from the table above.

In response, MCU 123 may cause the text-based QR code to be displayed to display 124. FIG. 2 illustrates an example text-based QR code 200 that may be generated on display 124, in accordance with embodiments of the present disclosure. As shown in FIG. 2, text-based QR code 200 may include a plurality of lines of characters (e.g., each line terminated with a linefeed character), each line of characters comprising space characters 32 and special characters (e.g., full block characters 219, lower half block characters 220, and upper half block characters 223), arranged to assemble an image-based QR code. In some embodiments, MCU 123 may also cause other text to be displayed to display 124 alongside the text-based QR code, such as those entries in the "Text to be displayed" column from the table above.

A user then may capture the text-based QR code with any suitable capture device (e.g., a smart phone), and such capture device may, in response, browse to the URL associated with the text-based QR code.

FIG. 3 illustrates a flow chart of an example method 300 for dynamically generating a text-based scannable code, for example a text-based QR code, in response to an error, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, in response to occurrence of an error of information handling system 102, management controller 112 may determine an error code associated with the error. At step 304, management controller 112 may determine a URL associated with the identified error code, such as by reading an entry associated with the identified error code stored in a look-up table to another suitable data structure.

At step 306, management controller 112 may generate a text-based scannable code based on the text string of the URL using any appropriate scheme. For example, management controller 112 may generate the text-based scannable code as a string of special characters (e.g., rectangular boxes, space characters, and linefeed characters, as described above). In some embodiments, the text-based scannable code may include a text-based QR code, such as example text-based QR code 200 shown in FIG. 2. However, other text-based scannable codes may be created in accordance with this disclosure, including without limitation Universal Product Codes (UPCs) or other bar codes, and/or other two-dimensional bar codes besides QR codes.

At step 308, management controller 112 may then communicate to MCU 123 the newly-generated text-based scannable code as a string of special characters (e.g., the block characters described above), space characters, and linefeed characters. In some embodiments, management controller 112 may also communicate other text to be displayed alongside the text-based scannable code.

At step 310, MCU 123 may cause the text-based scannable code to be displayed to display 124. In some embodiments, MCU 123 may also cause other text to be displayed alongside the text-based scannable code on display 124. A user then may capture the text-based scannable code with any suitable capture device (e.g., a smart phone), and such capture device may, in response, browse to the URL associated with the text-based scannable code.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented in whole or part using management controller 112, MCU 123, and/or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a memory; and
a processor communicatively coupled to the memory and configured to convert a string of text into a text-based scannable code comprising a string of characters including space characters, special characters, and line-feed characters, such that when the string of characters is displayed to a display device, the string of characters resembles an image-based scannable code, wherein the special characters comprise one or more of a full block character, a lower block character, and an upper block character.

2. The information handling system of claim 1, wherein the string of characters resembles an image based quick-response code.

3. The information handling system of claim 1, wherein the special characters comprise one or more characters, each of the one or more characters comprising a respective rectangular box.

4. The information handling system of claim 1, wherein the string of text comprises a uniform resource locator, and scanning of the string of characters as displayed to the display device by a capture device causes the capture device to browse to the uniform resource locator.

5. The information handling system of claim 1, the processor further configured to communicate the string of characters to a controller of the display device to cause the string of characters to be displayed to the display device.

6. The information handling system of claim 1, wherein the text-based scannable code is associated with an error code generated in response to an error occurring on the information handling system.

7. A method comprising:

converting a string of text into a text-based scannable code comprising a string of characters including space characters, special characters, and linefeed characters, such that when the string of characters is displayed to a display device, the string of characters resembles an image-based scannable code, wherein the special characters comprise one or more of a full block character, a lower block character, and an upper block character.

8. The method of claim 7, wherein the string of characters resembles an image based quick-response code.

9. The method of claim 7, wherein the special characters comprise one or more characters, each of the one or more characters comprising a respective rectangular box.

10. The method of claim 7, wherein the string of text comprises a uniform resource locator, and scanning of the string of characters as displayed to the display device by a capture device causes the capture device to browse to the uniform resource locator.

11. The method of claim 7, further comprising communicating the string of characters to a controller of the display device to cause the string of characters to be displayed to the display device.

12. The method of claim 7, wherein the text-based scannable code is associated with an error code generated in response to an error occurring on the information handling system.

13. An article of manufacture comprising:

a non-transitory computer-readable medium; and computer-executable instructions carried on the computer-readable medium, the instructions readable by a processor, the instructions, when read and executed, for causing the processor to:

convert a string of text into a text-based scannable code comprising a string of characters including space characters, special characters, and linefeed characters, such that when the string of characters is displayed to a display device, the string of characters resembles an image-based scannable code, wherein the special characters comprise one or more of a full block character, a lower block character, and an upper block character.

14. The article of claim 13, wherein the string of characters resembles an image based quick-response code.

15. The article of claim 13, wherein the special characters comprise one or more characters each of the one or more characters comprising a respective rectangular box.

16. The article of claim 13, wherein the string of text comprises a uniform resource locator, and scanning of the string of characters as displayed to the display device by a capture device causes the capture device to browse to the uniform resource locator.

17. The article of claim 13, the instructions for further causing the processor to communicate the string of characters to a controller of the display device to cause the string of characters to be displayed to the display device.

18. The article of claim 13, wherein the text-based scannable code is associated with an error code generated in response to an error occurring on the information handling system.

* * * * *